(12) United States Patent
Hill

(10) Patent No.: US 9,412,213 B2
(45) Date of Patent: Aug. 9, 2016

(54) RFID READER

(71) Applicant: Cambridge Resonant Technologies Ltd., Cambridge (GB)

(72) Inventor: Nicholas Patrick Roland Hill, Cambridge (GB)

(73) Assignee: Cambridge Resonant Technologies Ltd., Cambridge (GB)

( * ) Notice: Subject to any disclaimer, the term of this patent is extended or adjusted under 35 U.S.C. 154(b) by 69 days.

(21) Appl. No.: 14/559,316

(22) Filed: Dec. 3, 2014

(65) Prior Publication Data

US 2015/0154820 A1 Jun. 4, 2015

Related U.S. Application Data

(63) Continuation of application No. 12/086,560, filed as application No. PCT/GB2006/050440 on Dec. 7, 2006, now Pat. No. 9,013,268.

(60) Provisional application No. 60/758,535, filed on Jan. 13, 2006.

(30) Foreign Application Priority Data

Dec. 16, 2005 (GB) .................................. 0525623.5
Jun. 8, 2006 (GB) .................................. 0611243.7

(51) Int. Cl.
*H04Q 5/22* (2006.01)
*G05B 19/00* (2006.01)
(Continued)

(52) U.S. Cl.
CPC ............ *G07C 9/00111* (2013.01); *G01V 15/00* (2013.01); *G06K 7/0008* (2013.01); *G06K 7/10366* (2013.01); *G06K 19/0723* (2013.01)

(58) Field of Classification Search
CPC . G06K 7/0008; G06K 19/0723; G06K 17/00; G06K 2017/0045; G06K 7/10366; G06K 7/10108; G06K 19/0713; G06K 19/07749; G06K 19/07767; G06K 7/10039; G06K 7/10069; G06K 7/10356; G08C 17/04; G11C 5/142; H04B 10/071; H04B 10/07955; H04B 10/504; H04B 15/00; H04B 17/318
See application file for complete search history.

(56) References Cited

U.S. PATENT DOCUMENTS 4,550,444 A 10/1985 Uebel
4,912,471 A * 3/1990 Tyburski ............... B61L 25/045
340/10.34

(Continued)

FOREIGN PATENT DOCUMENTS

GB 0239562 4/1924

*Primary Examiner* — Steven Lim
*Assistant Examiner* — Muhammad Adnan
(74) *Attorney, Agent, or Firm* — Wolf, Greenfield & Sacks, P.C.

(57) ABSTRACT

Embodiments of the invention relate to the field of RFID (radio frequency identification). Some particularly preferred embodiments relate to a high-Q, so-called "full duplex" (FDX) RFID Reader. An RFID tag reader, the reader comprising: an electromagnetic (EM) field generator for generating an electromagnetic (EM) field for modulation by said tag, said modulation comprising modulated load of said EM field by said tag; a detector system responsive to fluctuations in strength of said EM field at said reader; a negative feedback system responsive to said detector system to provide a control signal for said EM field generator for controlling said EM field generator to reduce said detected fluctuations; and a demodulator responsive to said control of said EM field to demodulate said EM field modulation by said tag.

19 Claims, 18 Drawing Sheets

(51) Int. Cl.
*G06F 7/00* (2006.01)
*G06F 7/04* (2006.01)
*H04Q 9/00* (2006.01)
*B60R 25/10* (2013.01)
*G07C 9/00* (2006.01)
*G01V 15/00* (2006.01)
*G06K 7/00* (2006.01)
*G06K 19/07* (2006.01)
*G06K 7/10* (2006.01)

(56) References Cited

U.S. PATENT DOCUMENTS

| | | | |
|---|---|---|---|
| 4,924,171 A | 5/1990 | Baba et al. | |
| 5,025,492 A | 6/1991 | Viereck | |
| 5,374,930 A | 12/1994 | Schuermann | |
| 5,541,604 A | 7/1996 | Meier | |
| 5,812,065 A | 9/1998 | Schrott et al. | |
| 6,044,795 A | 4/2000 | Matsuura | |
| 6,317,027 B1* | 11/2001 | Watkins | G06K 7/0008 340/10.1 |
| 6,650,226 B1 | 11/2003 | Wuidart | |
| 6,650,227 B1 | 11/2003 | Bradin | |
| 7,492,280 B2 | 2/2009 | Horler | |
| 8,111,140 B2* | 2/2012 | Rizzo | G06K 19/0723 340/10.1 |
| 8,325,042 B1* | 12/2012 | Hyde | G06K 19/07749 340/10.1 |
| 2005/0140457 A1* | 6/2005 | Bellantoni | G06K 7/0008 332/106 |
| 2005/0174255 A1 | 8/2005 | Horler | |
| 2005/0184860 A1 | 8/2005 | Taruki et al. | |
| 2005/0237123 A1 | 10/2005 | Berhorst et al. | |
| 2006/0197653 A1 | 9/2006 | Kung et al. | |
| 2006/0238301 A1* | 10/2006 | Wu | G06K 7/0008 340/10.1 |
| 2007/0206704 A1* | 9/2007 | Zhou | G06K 7/0008 375/316 |
| 2008/0238630 A1* | 10/2008 | Chen | G06K 19/0701 340/10.5 |
| 2009/0058601 A1* | 3/2009 | Balachandran | H03G 11/00 340/10.1 |
| 2009/0072950 A1* | 3/2009 | Gili | H01Q 1/2225 340/10.1 |
| 2009/0284351 A1* | 11/2009 | Rossman | G06K 19/07749 340/10.1 |
| 2011/0133894 A1* | 6/2011 | Hennig | H03J 3/20 340/10.1 |
| 2011/0205026 A1* | 8/2011 | Bateman | G06K 7/0008 340/10.1 |

* cited by examiner

RFID READER

RELATED APPLICATIONS

This application is a continuation of U.S. application Ser. No. 12/086,560, titled "RFID Reader," filed on Apr. 27, 2010 as a national stage entry of international application No. PCT/GB2006/050440, titled "RFID Reader," filed on Dec. 7, 2006, which claims the benefit of U.S. provisional application Ser. No. 60/758,535, titled "RFID Reader," filed on Jan. 13, 2006. The international application also claims the benefit of U.K. application No. 0611243.7, titled "RFID Reader," filed on Jun. 8, 2006 and of U.K. application No. 0525623.5, titled "RFID Reader," filed on Dec. 16, 2005. The entire disclosures of the foregoing applications are incorporated herein by reference.

FIELD OF THE INVENTION

The invention broadly relates to the field of RFID (radio frequency identification). Some particularly preferred embodiments relate to a high-Q, so-called "full duplex" (FDX) RFID Reader.

BACKGROUND OF THE INVENTION

In an RFID system with a passive transponder generally the reader has two main functions. Firstly the reader supplies energy to the transponder through an RF energising field. The transponder picks this up with an antenna and resonant circuit tuned to the actuation frequency. Secondly, once the transponder is powered, the reader also needs to communicate with the remote device. These two tasks are quite different in nature and that can translate to conflicting requirements on the reader.

The powering of the transponder is important in determining the read range of the system. The transponder and reader are often weakly coupled and care must be taken to maximise the energy transfer from reader to transponder. A resonant circuit is generally used to improve the efficiency by recycling energy in the reader antenna. For maximum energy transfer, a high Q reader antenna matched to the resonant frequency of the transponder would give optimal efficiency. However, once powered, the system is required to communicate, and high Q severely limits the communication bandwidth achievable. In fact the communication bandwidth is inversely proportional to the resonance Q, therefore any improvement in the powering efficiency through an increased system Q has a direct consequence of reduced communication bandwidth.

In a half duplex system (HDX) the powering cycle and communication are separated in time. This provides flexibility in separation of the two functions of the reader and a number of approaches in the prior art have been proposed to improve the efficiency of power transfer while keeping the appropriate communication bandwidth. The most basic method is to use a separate circuit for the power and communication links, for example U.S. Pat. No. 4,550,444 and U.S. Pat. No. 4,912,471, which can therefore be optimised separately. The drawback of this approach is added complexity and cost associated with separate circuits. This is remedied by the alternative approach taken in U.S. Pat. No. 5,025,492, U.S. Pat. No. 5,374,930, and U.S. Pat. No. 5,541,604, where the same antenna is used for both power transmission and communication. A damping circuit is coupled into the resonance when the powering cycle is complete such that the powering cycle may be carried out optimally with a high Q antenna, switching to lower Q and therefore wider bandwidth for the communication cycle.

The above solution to the conflicting Q requirements is made possible because powering and reading functions are separated in time. In contrast a full duplex system (FDX) does not enable such an approach. In an FDX system the power from the reader is kept on for the duration of the read cycle. The transponder does not contain a separate transmitter, but instead communicates with the reader through modulation of the load on its pickup coil; the load modulation is picked up and interpreted by the reader. An FDX system can have the advantage of simpler transponders with lower power requirements.

Under some circumstances it can be advantageous to provide separate powering and communication antennae. This however has to be done with care as both antennae are operating simultaneously and mutual coupling can introduce problems. For example, simply setting up a powering antenna with high Q and a closely spaced communication antenna with lower Q will not necessarily offer a benefit. The modulation associated with the communication can cause ringing in the powering antenna that confuses the pickup signal in the communication antenna due to mutual coupling. The additional drawback of a multi-coil reader is increased complexity and cost.

There is therefore a need for a single antenna FDX reader that has simultaneously the properties of high Q for efficient power transfer to a transponder and also wide communication bandwidth.

SUMMARY OF THE INVENTION

The invention is set out in the independent claims.

We describe techniques by which a high Q coil may be used for wide bandwidth communications, for example with an FXD RFID transponder. Broadly these arise from the observation that the cause of the conventional bandwidth limitation is that the reader antenna is required to change state. More specifically, the load modulation by the transponder gives rise to modulation of the antenna voltage amplitude and the reading function is carried out by measuring this amplitude modulation. Any such change in state of a high Q system requires an increased timescale, limiting the rate of data transfer. In embodiments the modulated load of the EM field by the tag may comprise modulated absorption.

We describe an approach where negative feedback is introduced between the stimulus signal and the resonance amplitude. This feedback acts to keep the amplitude of the antenna voltage constant. Now load modulation by the transponder is quickly compensated for by a change in the reader to keep the antenna amplitude constant. In this manner the reader can adapt quickly to changes induced by the transponder, in embodiments avoiding the rate limitation associated with a high Q antenna. The modulation signal may be monitored indirectly through the change in the reader input into the resonance. Alternatively, if the feedback is less strong and the resonance amplitude is allowed to vary by some degree then the modulation may be monitored either through the reader input or through changes in the resonance amplitude. In this latter case the negative feedback still acts to reduce the amplitude variation and hence can increase the speed of response of the reader compared with a system without feedback.

In these embodiments, the transponder or tag communicates via resistive load modulation. When operating at the resonance frequency of the transponder, this modulation translates to a resistive transformed impedance, as seen by the reader. Consequently, when feedback is used to keep the amplitude of the reader antenna constant, this translates to a modulation of the power delivered to the antenna. The power may be conveniently measured to yield the modulation waveform.

Alternatively the transponder or tag may modulate a reactive component (also load modulation) such as a capacitance, for example to move a resonant frequency of the tag (when, again, absorption of an EM field by the tag would change because the frequency would change), or to cause some other effect detectable at the reader. Broadly, the modulating result is a detectable impedance change at the reader.

The high Q of the reader antenna can be beneficial in extending the read range of the system. The high Q translates to a reduced level of power delivered to the antenna, for a given resonance amplitude. The percentage modulation in the input power caused by the transponder is therefore enhanced, making it easier to pick up at low levels. The use of a high Q reader antenna therefore has the potential to not only increase the efficiency of the reader but also extend the effective read range. Embodiments of the RFID system we describe may be incorporated in one or more of the following:

An asset tracking RFID system; an identification RFID system of people or animals; an animal feeding control RFID system; an automatic vehicle identification RFID system; for labelling of products in a retail environment; for theft protection or bill totalling; and an RFID system for storage information, for example on a credit card or a passport.

BRIEF DESCRIPTION OF THE DRAWINGS

In FIGS. 2, 7, 10 and 12, although printing artefacts may appear, the areas within the signal envelopes should be solid because of the time scale on which the waveforms are depicted.

DETAILED DESCRIPTION OF THE EMBODIMENTS

Figure 1:
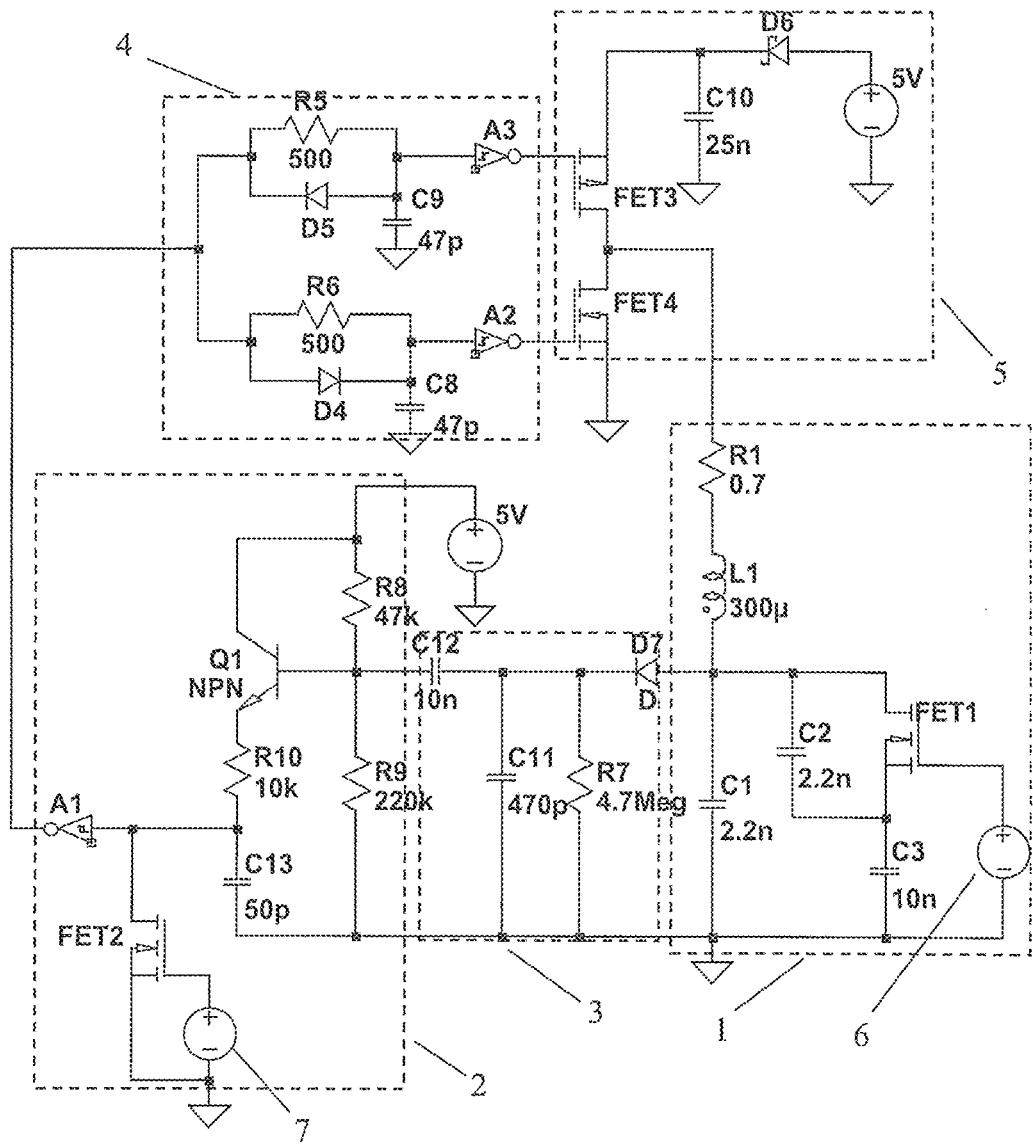
FIG. 1 is a schematic of an embodiment of a FDX RFID reader with PWM feedback.

FIG. 1 shows a schematic of an embodiment of the invention. This embodiment is based on a method that provides a resonant circuit 1 responsive to a wide frequency range. Also shown in the figure are PWM pulse generator 2, feedback circuit 3, deadband delay generator 4, stimulus pulse generator 5, FET gate voltage 6, and stimulus voltage 7.

In embodiments the resonant circuit comprises a controllable electric resonator comprising an inductor coupled to a first capacitor to form a resonant circuit, the resonator further comprising a controllable element, a second capacitor controllable coupled across said first capacitor by said controllable element, and a control device to control said controllable element such that a total effective capacitance of said first and second capacitor varies over a duty cycle of an oscillatory signal on said resonator. Preferably the controllable element comprises a switching element, in particular a FET; preferably the control device comprises a bias circuit for the FET.

The operation of the resonant circuit is now outlined and the additional elements are described in subsequent paragraphs.

The antenna comprises 32 turns of 660-strand 46AWG Litz wire, with overall diameter approximately 20 cm. Around the target operating frequency of 125 kHz the antenna has inductance of 300 µH (L1) and effective series resistance of 0.7Ω (R1), giving a Q of 340. The antenna is placed in series with the capacitor network C1, C2, C3 and an n-type FET. The capacitive network presents two different net capacitances in series with the antenna, depending on whether the FET is on or off. The duty cycle over which the FET is on depends on the oscillation amplitude through the associated variation of the FET source potential. The natural resonance frequency of the circuit is therefore determined by the amplitude. A high level of oscillation gives a near 50% duty cycle, whereas an amplitude less than Vth gives a 0% duty cycle. These two extremes of duty cycle correspond to two extremes of frequency, given by the following equations:

$$f_{50\%} = \frac{1}{\pi\left(\sqrt{L \cdot (C1 + (C2^{-1} + C3^{-1})^{-1})} + \sqrt{L \cdot (C1 + C3)}\right)}$$

$$f_{0\%} = \frac{1}{2\pi\sqrt{L \cdot (C1 + (C2^{-1} + C3^{-1})^{-1})}}$$

The above equations give a frequency range over which the circuit may resonate in response to a stimulus.

When a negative voltage is placed on the FET gate then a larger amplitude is required to keep the same duty cycle of FET conduction. Therefore a negative gate voltage may be used to increase the amplitude of oscillation to the required level. In this manner the resonance circuit block, 1, shown in FIG. 1 may be used in an RFID reader to generate an interrogation field over a wide frequency band. One benefit of this system is that excitation of an antenna may be achieved at a pre-determined frequency, without fine-tuning of an inductor and/or a capacitor. Furthermore, the system is tolerant to some degree of detuning e.g. with metallic or magnetic material placed in the vicinity of the antenna, provided the operating frequency band still encompasses the stimulus frequency.

Figure 2A:
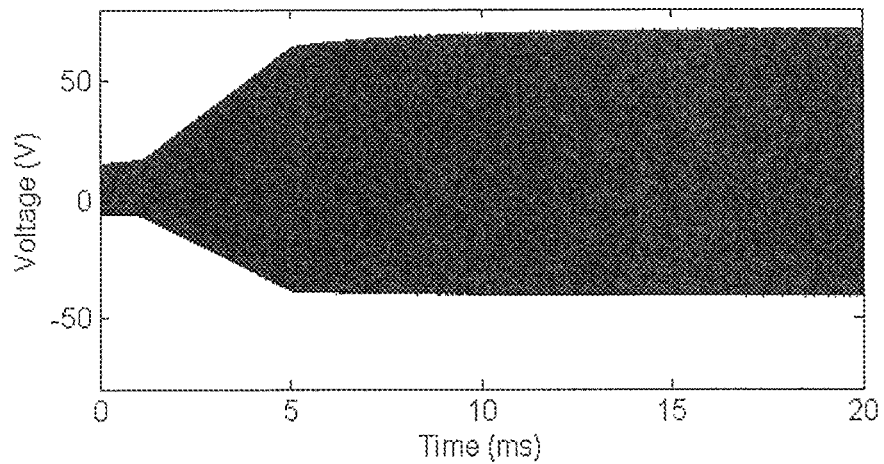
FIG. 2A is a plot of the resonance voltage as a function of time, where the amplitude of the resonance is ramped up.
Figure 2B:
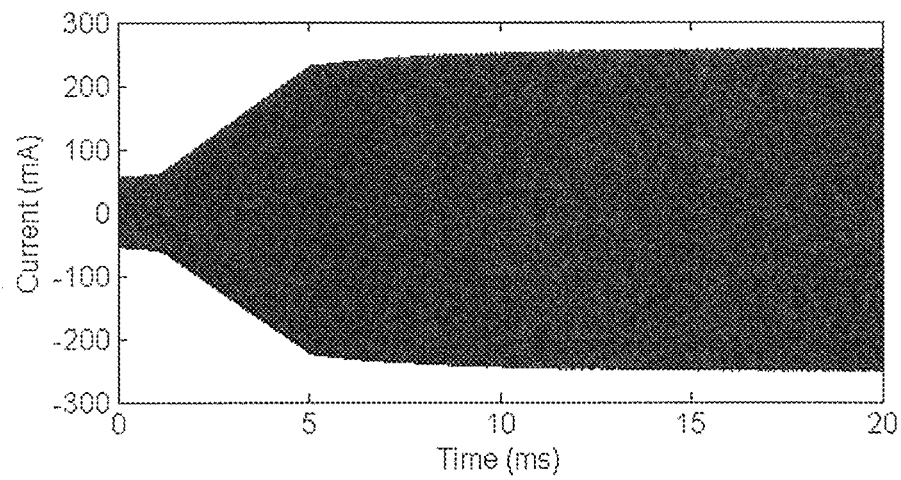
FIG. 2B is the corresponding plot of reader antenna current.

FIGS. 2A and 2B show the resonance voltage (FET1 drain) and inductor current as a function of time. Initially the FET gate voltage Vgate, 6, is set at 0V for a period of 1 ms, then decreasing from 0V to −25V over the next 4 ms. With the decrease in Vgate, the resonance voltage increases in amplitude, reaching +65V, −39V at 5 ms, then slowly increasing to +71V, −41V by 20 ms. The current shows a corresponding increase to +/−230 mA and then slowly to 253 mA. The further slow increase in the amplitude is linked to the feedback circuit and is described later. The gate voltage controlling the resonance amplitude (Vgate, 6) is shown as an ideal voltage source. Because the gate voltage required may exceed the available voltage rails, for example from a battery, the control circuitry for Vgate may use a negative voltage rail generated from the resonance. Such a negative rail builds up in magnitude with the resonance, giving sufficient level to set the gate voltage.

Figure 3A:
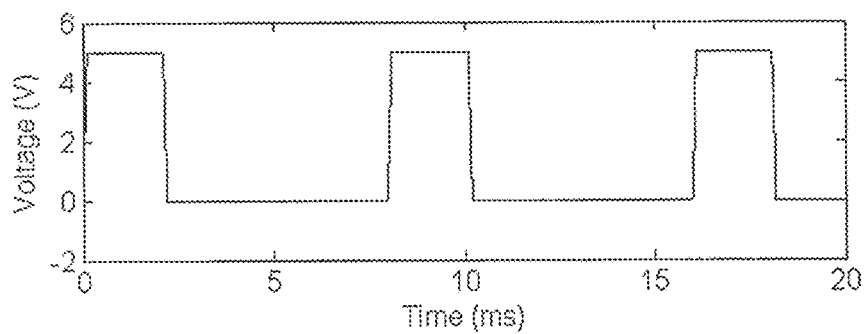
FIG. 3A shows the steady state waveform of the stimulus voltage.
Figure 3B:
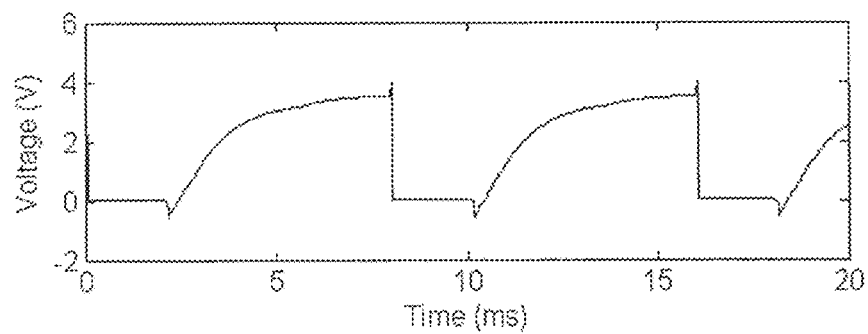
FIGS. 3B and 3C show the corresponding plots for the Schmitt trigger A1 input and output, respectively.
Figure 3C:
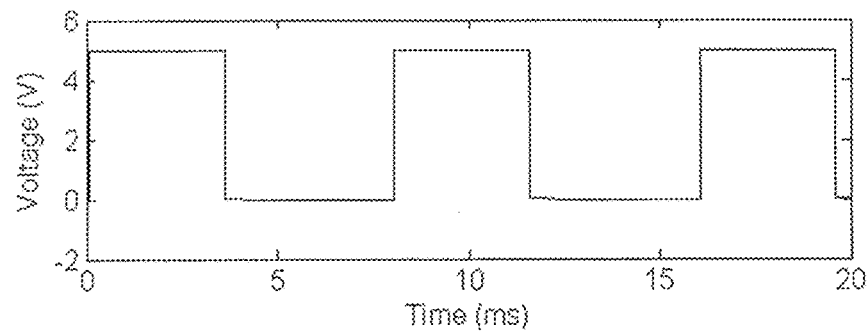

The pulse train applied to the stimulus FET pair (FET3 and FET4) is generated with pulse width modulation (PWM). Changes in the resonance amplitude are fed back to determine the pulse width. The steady state response is now used to illustrate the intended operation of the circuit. First the PWM generator, 2, waveforms are shown in FIG. 3. FIG. 3A shows the Vstimulus, 7, waveform controlled by an external source such as a microcontroller. In this example the stimulus waveform is a 2 μs square pulse repeated every 8 μs i.e. 125 kHz repeat rate. When the stimulus voltage is positive it turns on FET2, which zeros the input to Schmitt trigger A1. This is clear in the voltage waveform of the input to A1 shown in FIG. 3B. When the stimulus voltage is low FET2 is off and the A1 input increases through charging of C13 by the transistor Q1. The speed of this charging is controlled by the 10 k series resistor R10. The asymptote of the charging is 3.5V, 0.6V below the transistor base voltage of 4.1V. When the input to A1 exceeds the transition threshold of the Schmitt trigger then the output switches, as shown in FIG. 3C. The overall pulse width generated is approximately 3.5 μs, in part determined by the stimulus pulse and in part by the voltage ramp. Note that this discussion ignores the feedback path from the resonance voltage amplitude to the transistor base, which will be considered below.

Figure 4A:
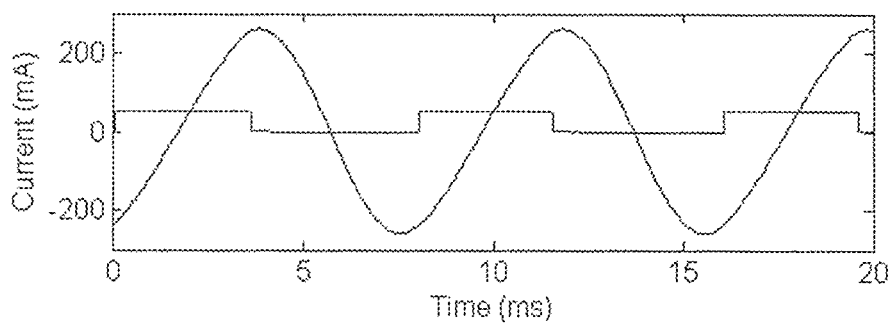
FIG. 4A shows the reader antenna current together with the output voltage from the Schmitt trigger A1.
Figure 4B:
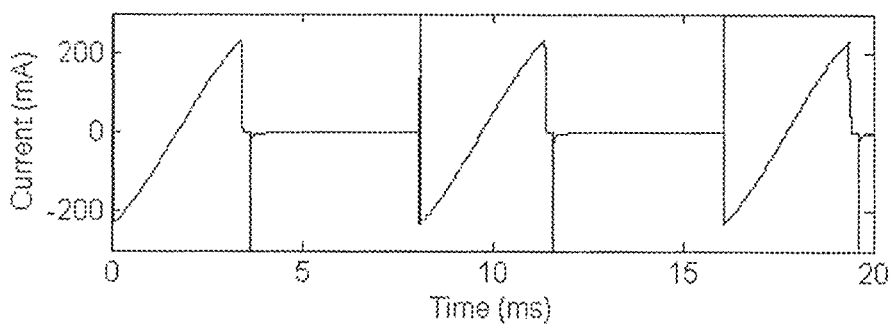
FIG. 4B shows the current into capacitor C10 and FIG. 4C shows the current supply pulse from the Schottky diode D6.
Figure 4C:
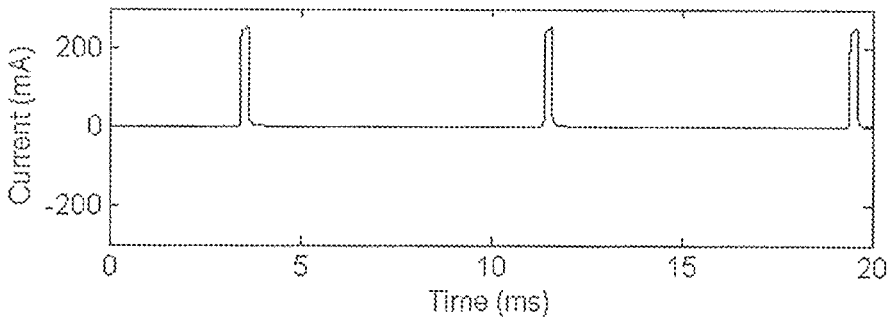
Figure 5A:
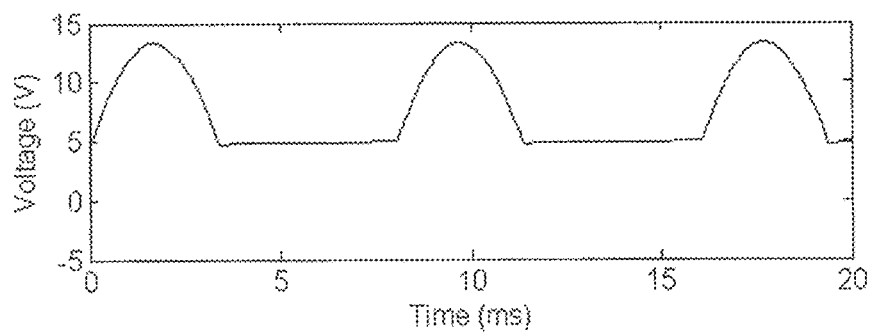
FIG. 5A is a plot of the capacitor C10 voltage.
Figure 5B:
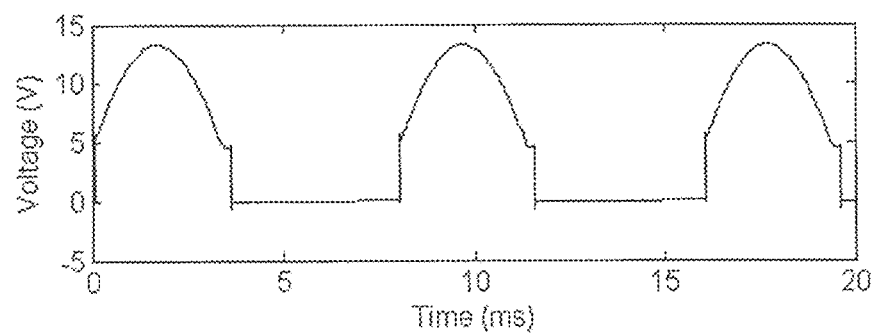
FIG. 5B is a plot of the voltage applied to the antenna and FIG. 5C is a plot of the current supply pulse from the Schottky diode D6.
Figure 5C:
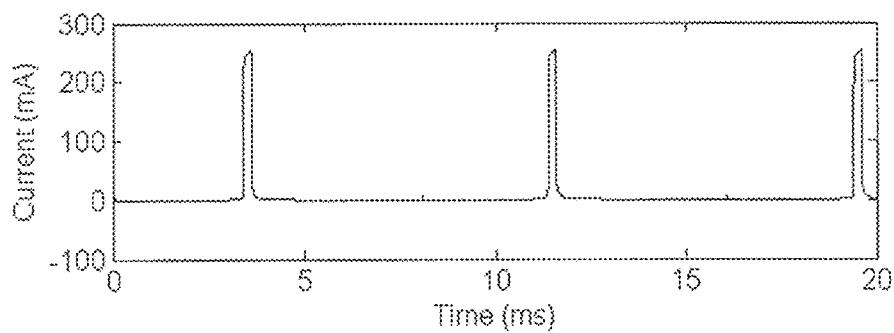

The 3.5 μs pulse is passed on to the deadband delay generator, 4, that inverts the pulse and introduces a deadband delay to minimise any shoot through current in the complementary FET pair FET3/FET4. The p-type FET3 is conducting for the duration of the 3.5 μs pulse and the n-type FET4 for the remainder of the 8 μs cycle. FIG. 4A shows the p-type FET3 gate voltage pulse (in arbitrary units) together with the inductor current. It is clear that the two waveforms are approximately 90 degrees out of phase, therefore most of the current through FET3 is transient, drawing little net power from the supply. When FET3 turns on, the current into the FET source is negative, flowing out of the FET into C10. This raises the voltage on C10 above its steady state level for the duration of the transient current, as shown in FIG. 5A, with the diode D6 cutting the circuit off from the 5V power. The transient current flows first into C10 and then back out, as shown in FIG. 4B. When zero net current has flowed, any further current lowers the potential of C10 such that the Schottky diode D6 starts to conduct. This diode provides a current pulse from the 5V power supply that keeps the resonance running. FIG. 5B shows the corresponding waveform of the voltage input to the resonance circuit and FIG. 5C shows the current pulse from D6 for comparison. This arrangement therefore supplies through D6 only enough current to keep the resonance amplitude constant.

Figure 6A:
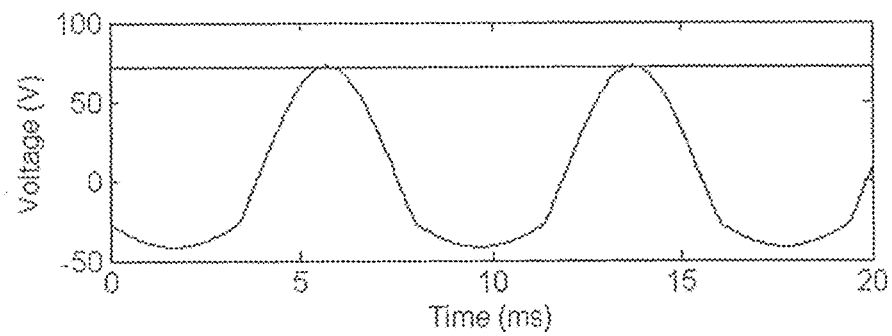
FIG. 6A is a plot of the resonance voltage together with the stored voltage on capacitor C12.
Figure 6B:
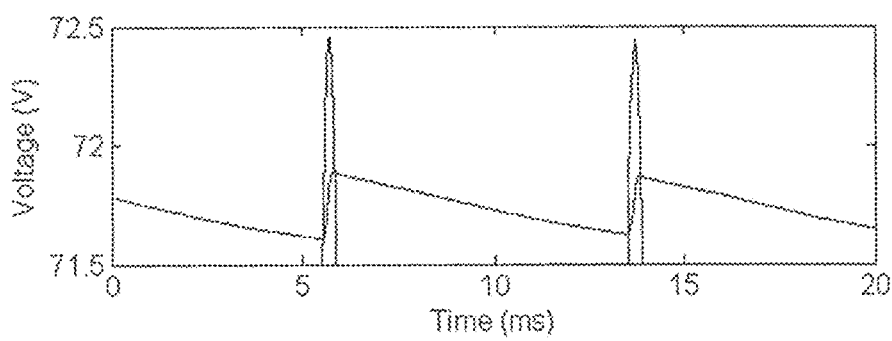
FIG. 6B is a zoomed graph of FIG. 6A.

The feedback circuit, 3, is now considered. FIG. 6A shows the resonance voltage together with the voltage stored on C11, the other side of the diode D7. FIG. 6B shows the same graph zoomed in. The stored voltage has an approximately sawtooth waveform where it decays by about 0.26V due to the 4.7M resistor placed across C11, and is topped up by the resonance voltage every cycle. The voltage stored on C11 is therefore representative of the resonance amplitude and is also sensitive to small changes in both directions (up to 0.26V per 8 μs cycle). In fact, because of the direction of the diode D7, any larger changes of increasing amplitude will be transferred to the stored voltage, however the decay rate set by R7 determines the sensitivity for changes to lower amplitude. This voltage is high pass filtered when it is passed through C12 to the base of the transistor. The filter frequency is set by C12 and the input impedance of the transistor amplifier, which is dominated by the bias resistors R8 and R9.

Figure 6C:
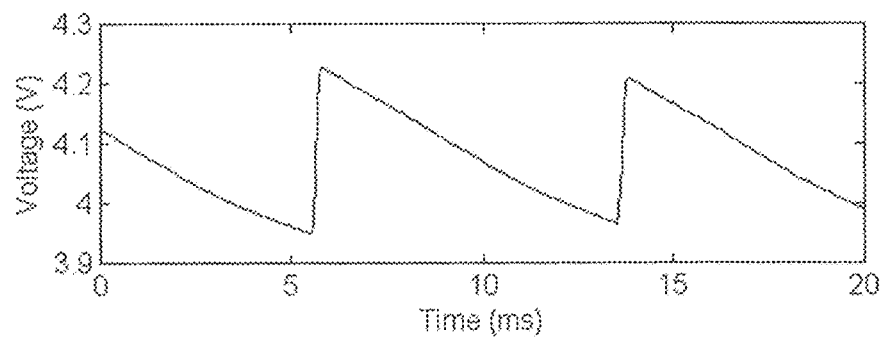
FIG. 6C is a plot of the transistor Q1 base voltage.

In the steady state, the resonance amplitude is fixed and the transistor base voltage, shown in FIG. 6C, sits at 4.1V, set by the bias resistors. There is also a small ripple that is passed on to the base through the high pass filter of C12. These together set the pulse with, which remains constant. Now considering a change in resonance amplitude due to a transponder modulating, any transient increase or decrease in the resonance amplitude is passed on to the transistor base. If the resonance amplitude increases then this increases the transistor base voltage, increasing the current that charges C13 and therefore reducing the pulse width. This reduction in pulse width reduces the energy into the resonance, acting to lower the resonance amplitude. The reverse effect takes place with a transient reduction in the resonance amplitude therefore negative feedback has been implemented to keep the amplitude constant. At this point it is noted that this negative feedback is responsible for the later slow ramp of the resonance amplitude identified in FIG. 2. The low filter frequency is set by C12 and the input impedance of the transistor amplifier controls the time constant of this slow ramp.

Figure 7A:
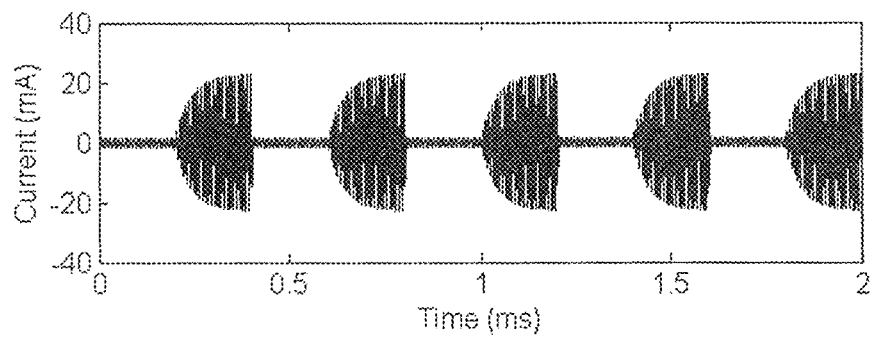
FIG. 7A is a plot of the modulated transponder current.
Figure 7B:
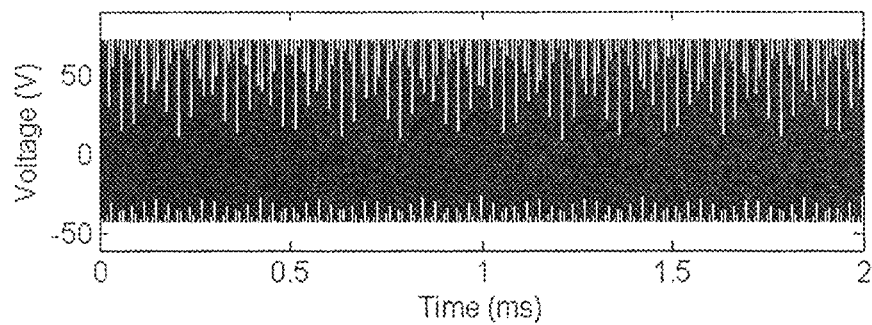
FIG. 7B is a plot of the resonance voltage and FIG. 7C is a zoomed plot of the same.
Figure 7C:
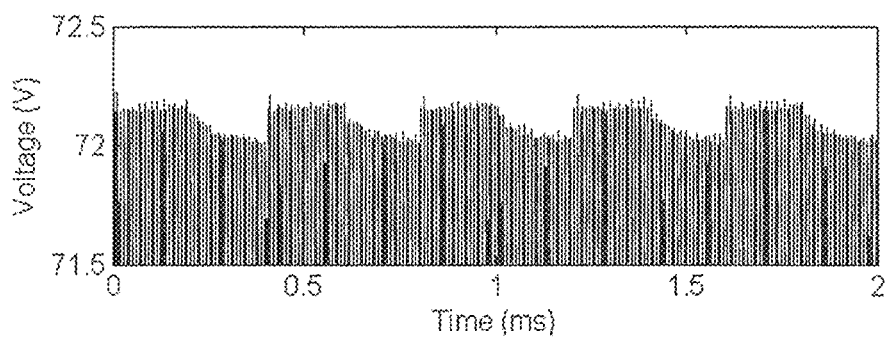

In order to demonstrate the effectiveness of the feedback, a transponder is introduced into the circuit. The transponder comprises a 1 mH inductor, with parallel capacitance 1.6 nF giving a resonant frequency of 125 kHz. The Q of the transponder, set by the 50Ω effective series resistance, is approximately 15. The coupling to the reader antenna is set to 1%. FIG. 7A shows the transponder current, where the modulation is clear. FIG. 7B shows the corresponding antenna resonance voltage with very little visible variation. The level of variation is clearer in FIG. 7C, where the zoomed in graph shows a peak-to-peak amplitude variation of 150 mV. This is amplitude is very low, demonstrating the efficacy of the negative feedback to keep the resonance constant amplitude. Furthermore, the timing of the transponder current waveform is well represented in the residual variation of the antenna voltage, demonstrating that the reader is responding quickly to the transponder, substantially unlimited by high Q rate constraints.

Figure 8A:
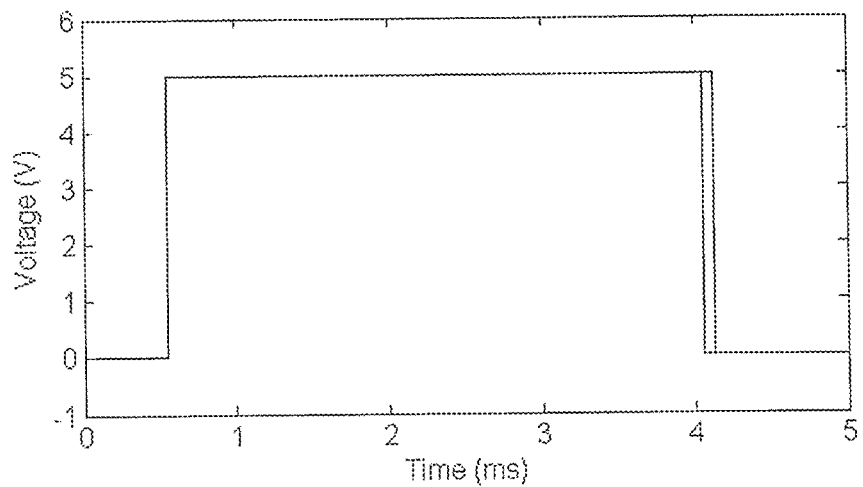
FIG. 8A is a plot of the output pulse from the Schmitt trigger A1 for the two cases of high and low transponder current.
Figure 8B:
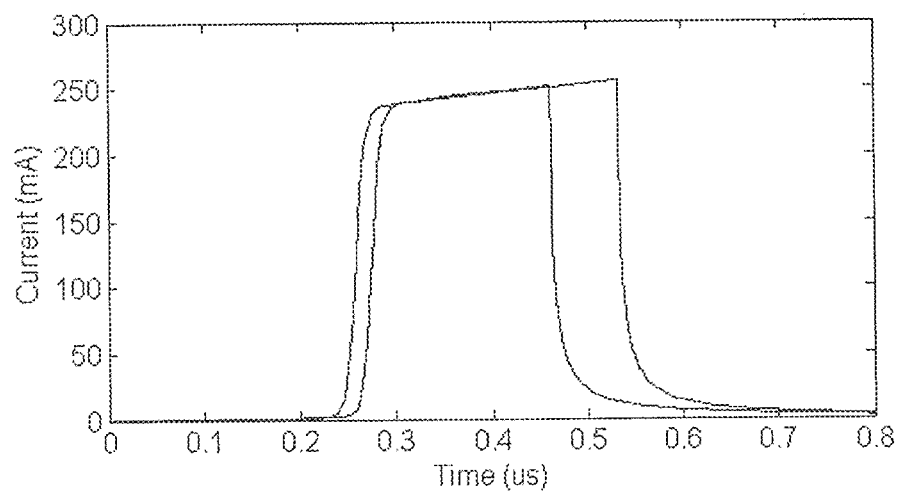
FIG. 8B is the corresponding plot of the current supply pulse from the Schottky diode D6.

FIG. 8 illustrates the change in input power by the reader in response to the transponder modulation. FIG. 8A shows the output of the Schmitt trigger A1 in the neighbourhood of the times 300 µs and 500 µs, corresponding to high and low current in the transponder, respectively. When the transponder current is high the effect of the feedback is to increase the width of the PWM, thus compensating for the additional energy dissipated in the transponder. The current pulses supplied by Schottky diode D6 are shown in FIG. 8B, where the high current situation corresponds to a significant widening, particularly towards later time. This widening of the PWM pulse is responsible for the additional energy supplied to the resonance. As mentioned earlier, the proportional effect on the total energy supplied is amplified up due to the high Q reader antenna.

Figure 9:
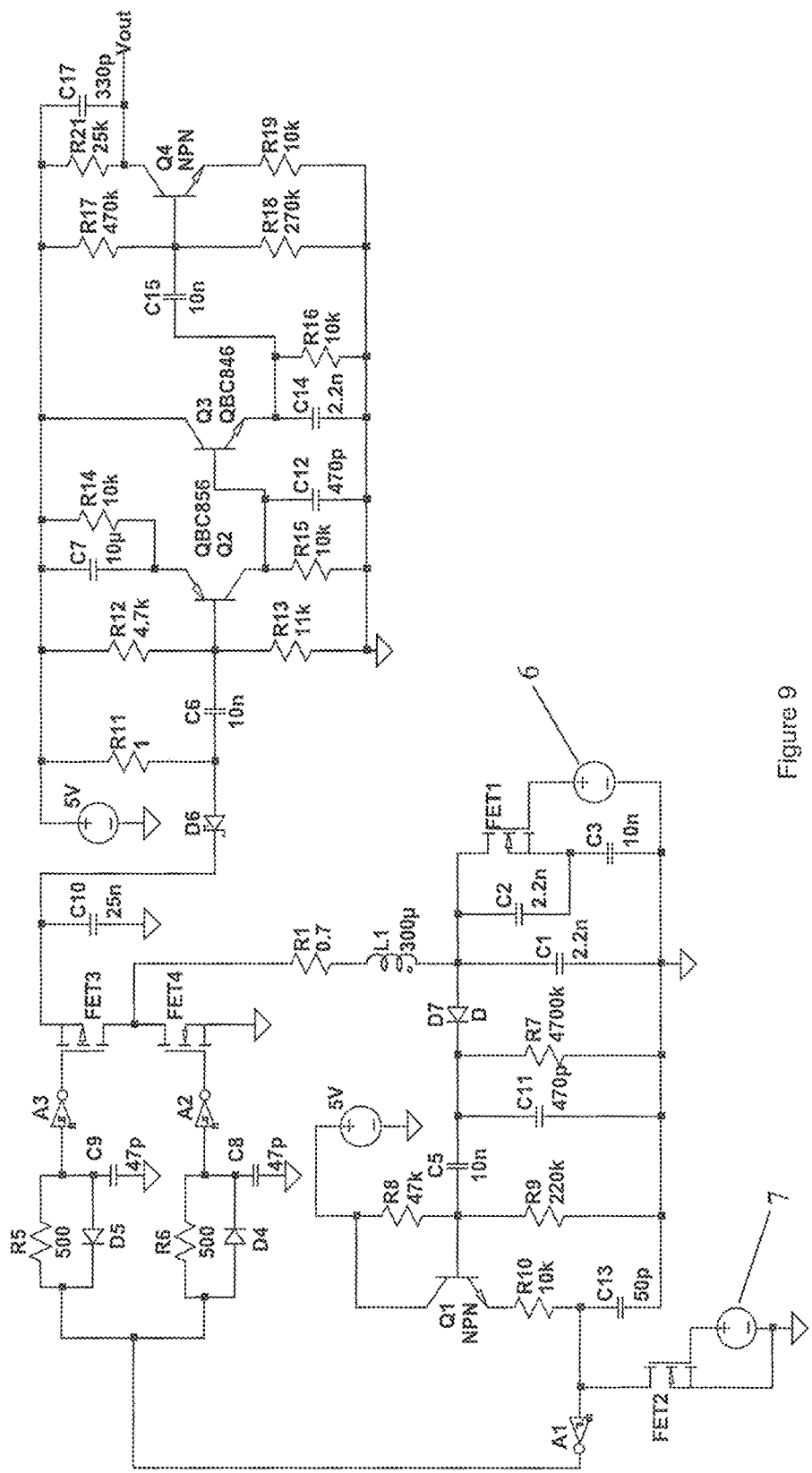
FIG. 9 is a schematic of an embodiment of a FDX RFID reader with PWM feedback and measurement of the input power into the resonance.

The total energy supplied to the resonance is therefore a sensitive measure of the transponder modulation. FIG. 9 shows a schematic of the first embodiment with an additional section that measures current pulses through D6. A current measurement resistor R11 generates voltage spikes in response the diode current, which are capacitively coupled to ramp generator Q2. This generates a sawtooth waveform where the maximum voltage is mostly controlled by the duration of the current supply pulse. The maximum voltage is stored on C14 (less the Vbe drop of Q3), which also includes a decay resistor R16 such that this voltage may pickup both increasing and decreasing variations. Lastly Q4 provides gain and low pass filtering to reduce the amplitude of the ripple associated with the R16.

Figure 10A:
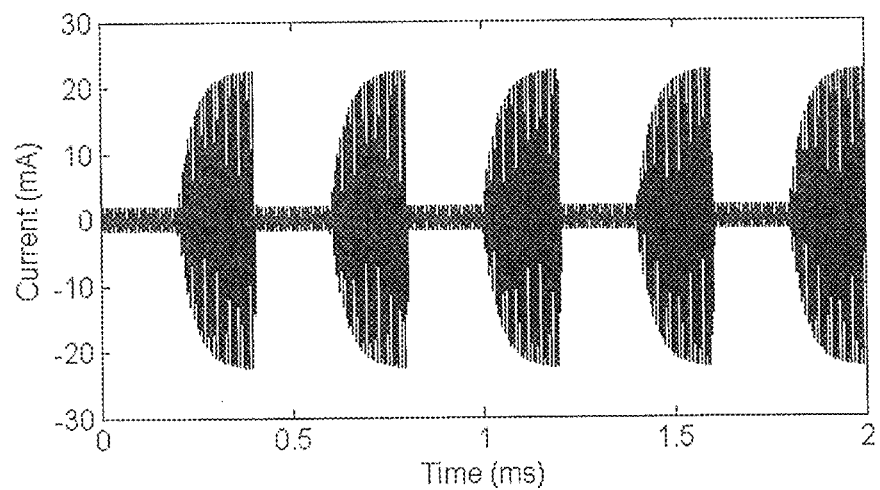
FIG. 10A is a plot of the modulated transponder current and FIG. 10B is the corresponding plot of the power measurement circuit output.
Figure 10B:
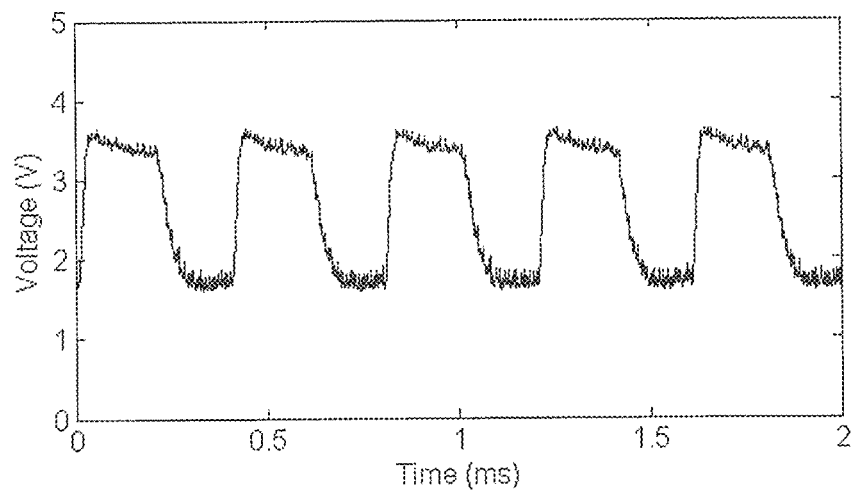

FIG. 10A shows the modulated transponder current and FIG. 10B shows the accompanying output voltage waveform, Vout. Vout provides an excellent measure of the modulation, especially exhibiting the different rates at which the transponder current builds up and is cut off. The reader does not add significantly to the time constants set by the Q of the transponder coil only, demonstrating how negative feedback has been employed to escape rate constraints associated with a high Q reader coil. The output waveform shown in FIG. 10B may be passed on to a level switch such as a Schmitt trigger or alternatively an analogue to digital converter (ADC) for subsequent interpretation of the transponder modulation signal.

Figure 11:
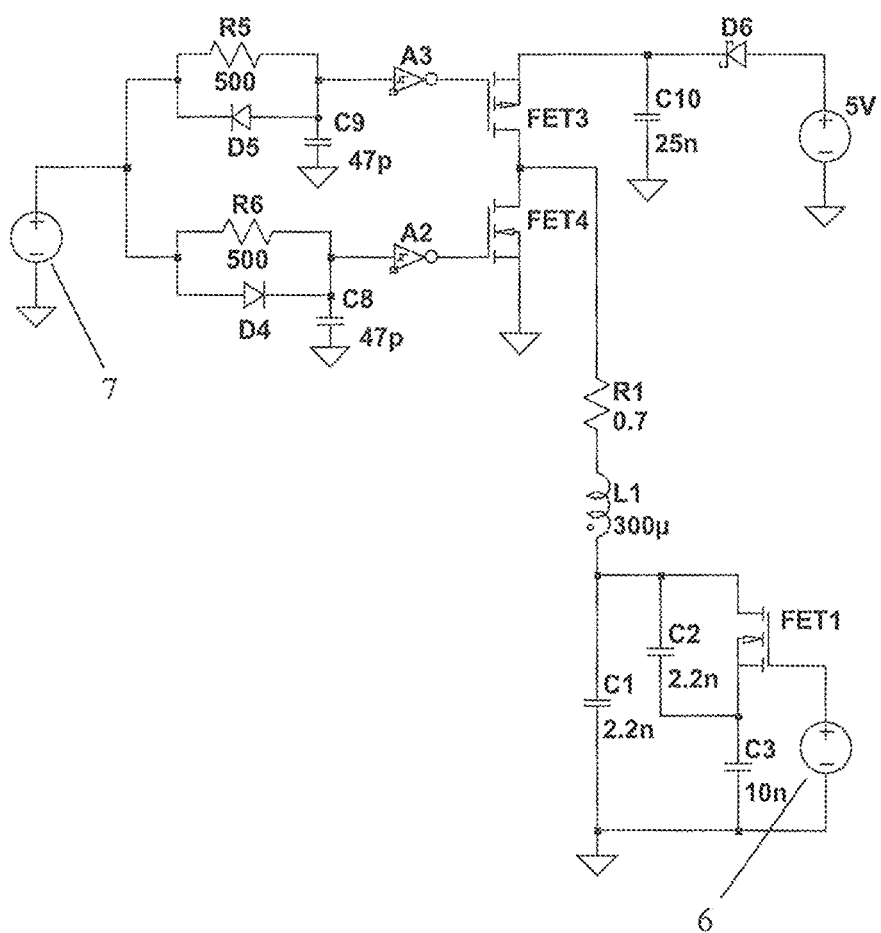
FIG. 11 is a schematic of an embodiment of a FDX RFID reader without PWM feedback.

FIG. 11 shows an alternative embodiment of the invention, which is similar to the first embodiment except that the PWM feedback path has been removed. Instead, the stimulus voltage waveform is applied directly to the deadband generator and in turn to the complementary FET pair that excite the resonance. The removal of the PWM feedback does reduce the level of feedback, however there still remains a feedback mechanism through the powering method involving C10 and D6. The performance and operation of the circuit are described below.

Figure 12A:
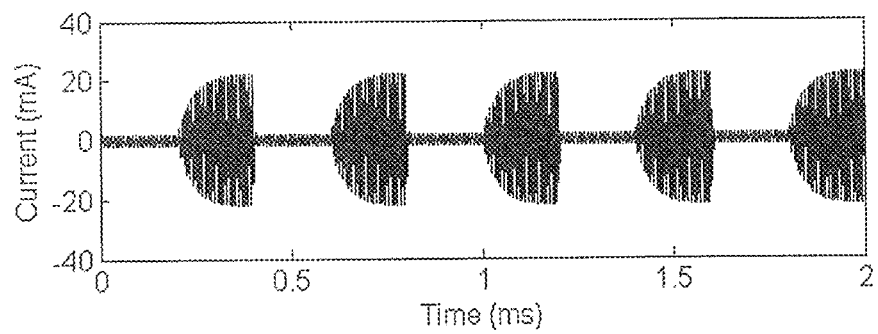
FIG. 12A is a plot of the modulated transponder current.
Figure 12B:
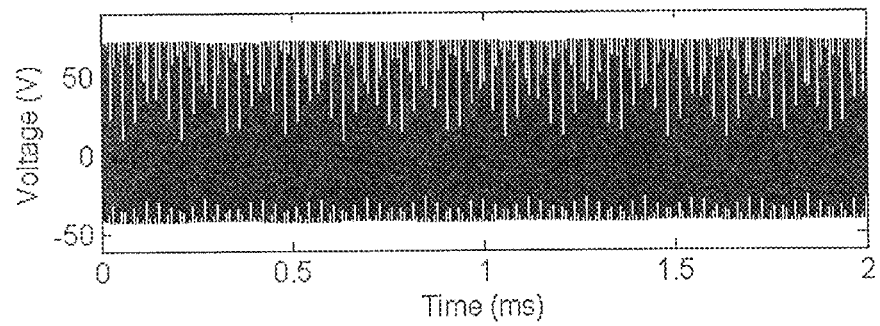
FIG. 12B is a plot of the resonance voltage and FIG. 12C is a zoomed plot of the same.

FIG. 12 shows graphs of the transponder current, resonance voltage, and the resonance voltage zoomed in. These graphs correspond to the graphs for the first embodiment shown in FIG. 7. The level of variation of the resonance voltage is still low, however it has increased by almost an order of magnitude over the first embodiment (1.1V vs. 150 mV).

Figure 13A:
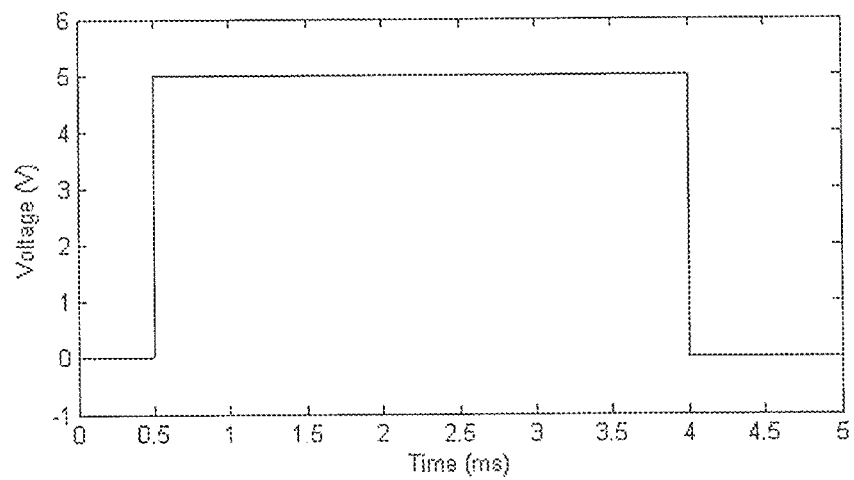
FIG. 13A is a plot of the stimulus voltage for the two cases of high and low transponder current.
Figure 13B:
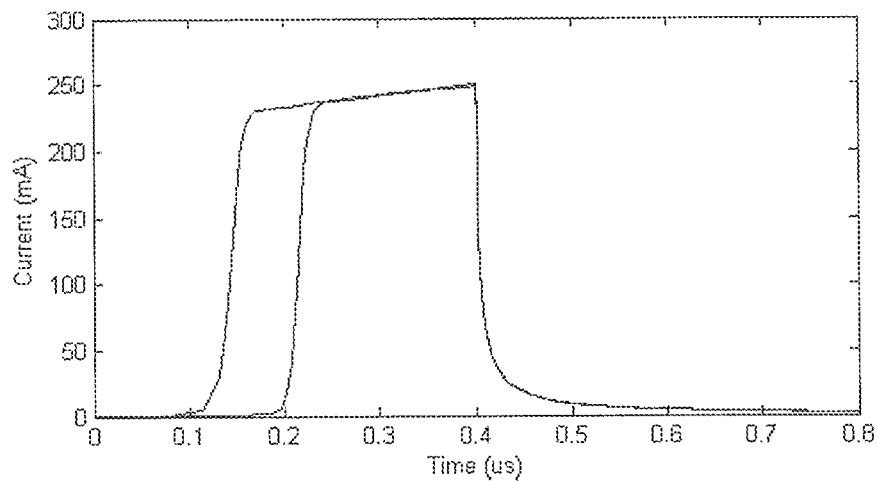
FIG. 13B is the corresponding plot of the current supply pulse from the Schottky diode D6.

FIG. 13 shows the stimulus waveforms in the neighbourhood of the times 300 µs and 500 µs, corresponding to high and low current in the transponder respectively. These graphs correspond to the graphs for the first embodiment shown in FIG. 8. FIG. 13A shows the two stimulus pulses, which are now indistinguishable since the PWM section has been removed i.e. the pulse width is not modulated anymore. FIG. 13B shows the current supplied to the resonance through D6, where the difference between the two cases is clear. When the transponder current is high the pulse width increases towards earlier time, increasing the energy input into the resonance. The mechanism at work here is now described. When the transponder current is high, dissipating additional energy, the current in the reader antenna drops. The current supply pulse through D6 has already been described in terms of a transient current into C10 and a subsequent non-transient supply through the diode, once zero net current has flowed. Given the drop in the resonance current, the transient current into C10 is over at an earlier time, giving more time for the supply pulse through D6 before the end of the stimulus pulse. In this manner, variations in the resonance amplitude are compensated for with variations in the input power, thus providing negative feedback. Note that this effect is evident in the first embodiment to a lesser extent, with the current supply pulse widening to both positive and negative time in response to an increase in transponder current. In that earlier case the effect is reduced by the efficacy of the PWM feedback that keeps the resonance amplitude more constant.

Figure 12C:
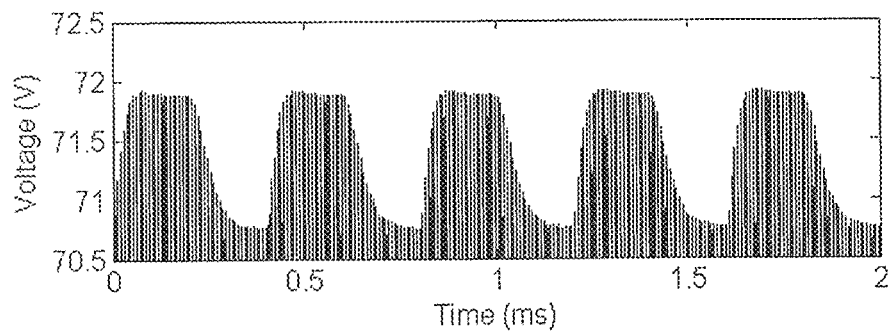

Although the level of feedback has been reduced by the removal of the PWM feedback, the performance of the circuit may still be adequate. The envelope variations evident in FIG. 12C are not as sharp as FIG. 7C, an effect that is particularly clear in the sharp cut off of the transponder current. The reader response time now appears to be comparable to that of the transponder.

Figure 14:
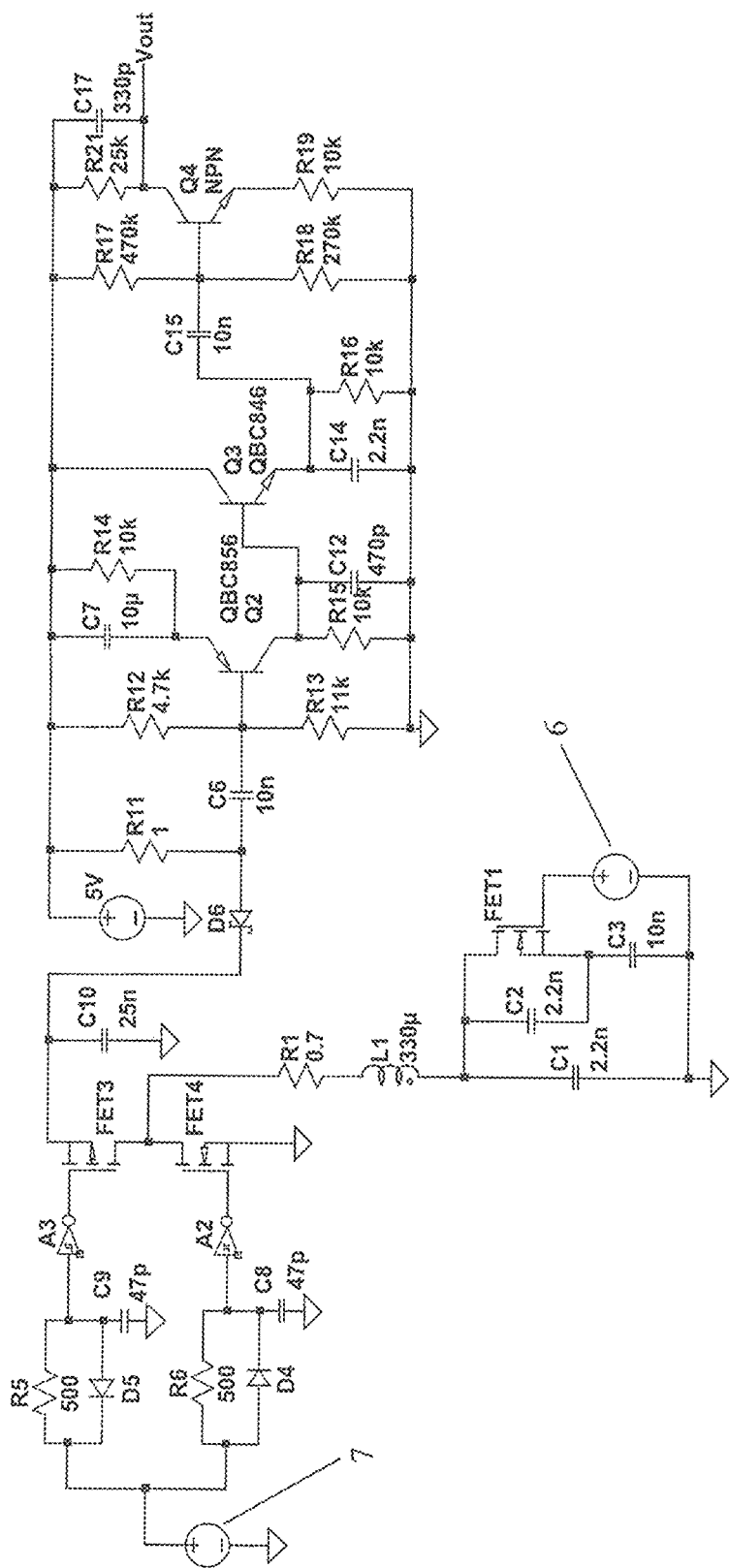
FIG. 14 is a schematic of an embodiment of a FDX RFID reader without PWM feedback and with measurement of the input power into the resonance.
Figure 15A:
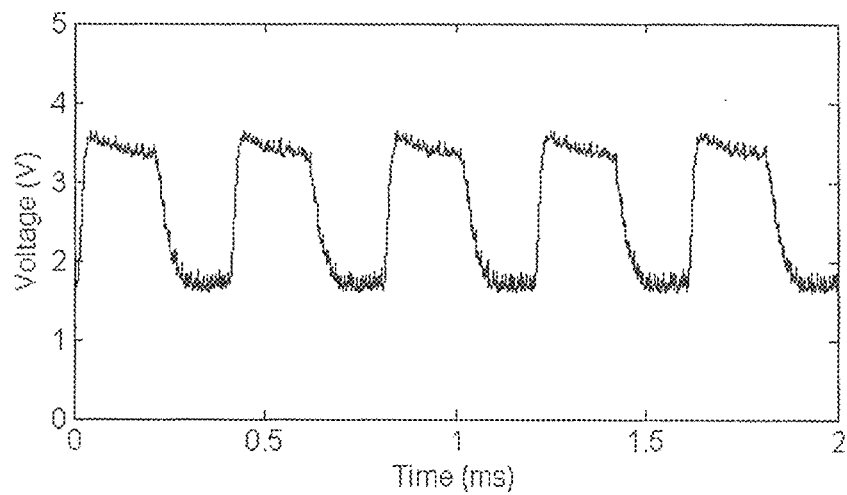
FIGS. 15A and 15B are plots of the power measurement circuit output voltage with and without PWM feedback, respectively.
Figure 15B:
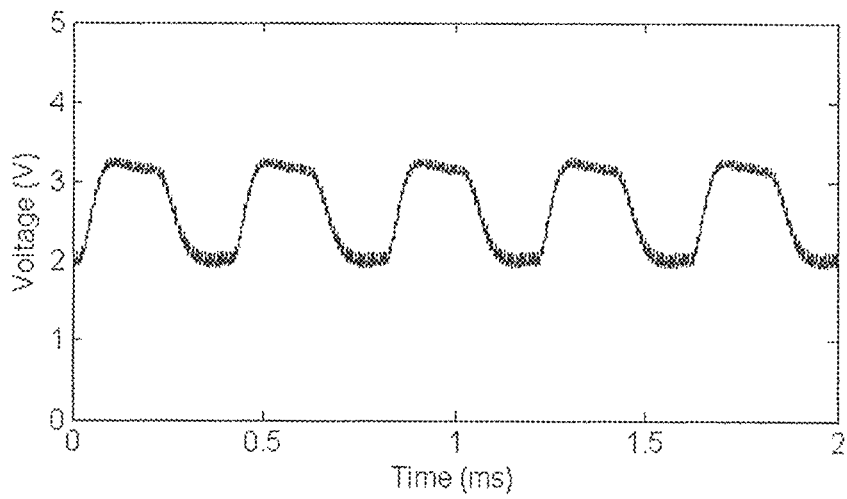

FIG. 14 shows a schematic of the present embodiment with a current measurement circuit added, as for the first embodiment. FIG. 15A shows the original output voltage of the first embodiment, whereas FIG. 15B shows the output voltage for the present embodiment. The new output voltage is lower amplitude and the transitions have been spread out by the increased time response of the reader. The waveform is however still a clear measure of the transponder modulation and may be passed on to a level switch or ADC for subsequent interpretation.

The reduced feedback embodiment described above illustrates that a range of alternative implementations are readily possible. With the highest levels of feedback, the resonance amplitude is kept very constant and the reader response time may be shorter than that of the transponder. With reduced levels of feedback the resonance amplitude variation increases together with the reader response time. This latter case can provide the advantage of a simpler, lower cost circuit whilst still maintaining adequate signal quality of the output voltage. Furthermore, because increased resonance amplitude variation is present, the modulation waveform may additionally be taken directly from the envelope of this voltage waveform, with the system providing the benefit of high efficiency through the use of a high Q reader coil.

Figure 16:
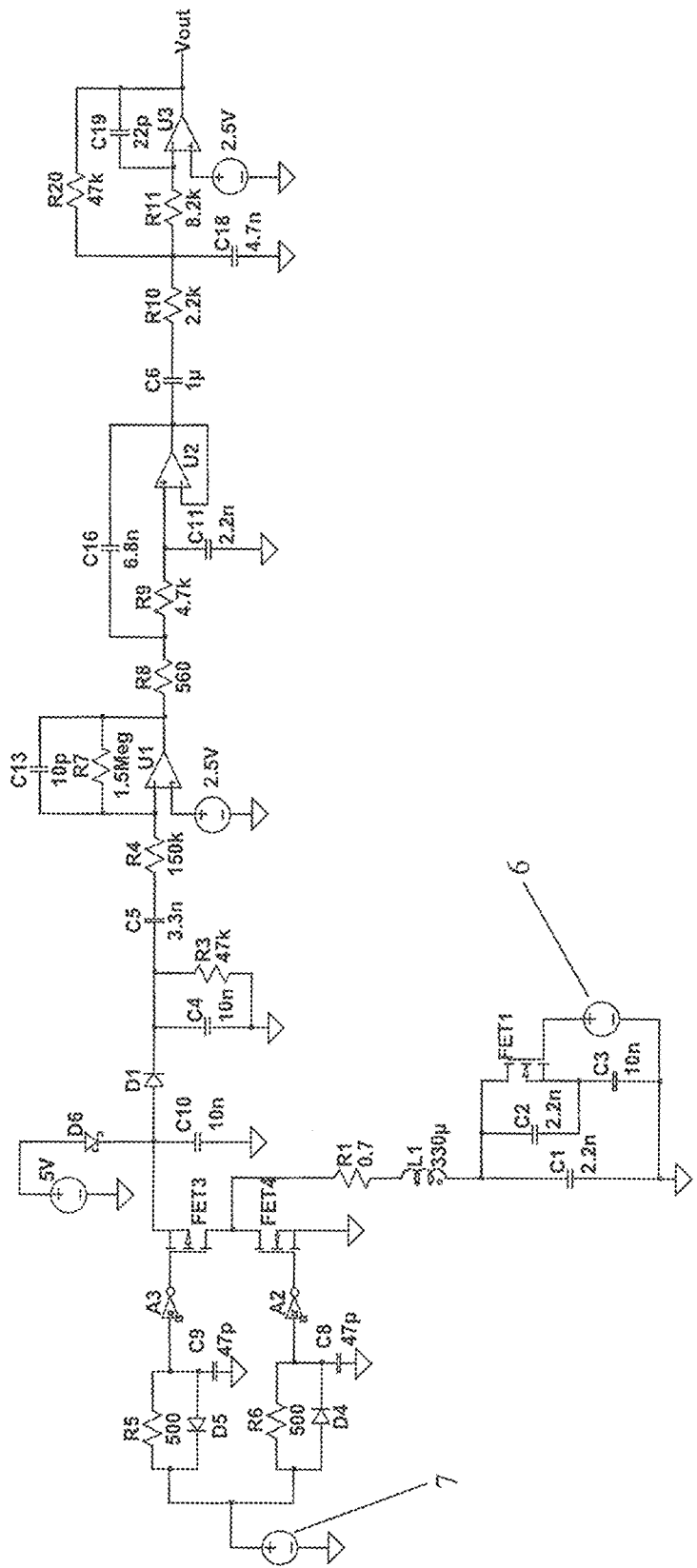
FIG. 16 is a schematic of an embodiment of a FDX RFID reader without PWM feedback and with measurement of the input power into the resonance through the maximum transient voltage.

FIG. 16 shows a third embodiment of the reader. This embodiment has the same resonance circuit and reduced feedback level as the second embodiment. However, the measurement of the input power is different. Rather than measuring the width of the current supply pulse into the resonance through the Schottky diode, the width of the preceding transient current through capacitor C10 is determined. Because the total pulse width is kept constant (no PWM feedback) any increase in the current supply pulse width is equal and opposite to the change in the width of the preceding transient current. As the transient current flows out of and back into the capacitor C10, the voltage rises and falls, as shown earlier in FIG. 5A. The maximum value of this voltage waveform is directly related to the width of this transient pulse. As such, a measure of the maximum value of this voltage on C10 is a sensitive measure of the input power into the resonance. One advantage of this approach is a simpler circuit without the need to generate a voltage ramp when previously measuring the width of the current supply pulse.

The peak voltage on C10 is stored on capacitor C4 through diode D1, with R3 providing a decay rate that makes the circuit sensitive to movements in the peak voltage in both directions. The voltage stored on C10 is then passed onto three opamp stages that provide high pass filtering to remove the static component of the voltage stored on C10, and also low pass filtering to remove the ripple at the carrier frequency of 125 kHz. The output voltage at Vout is subsequently passed on to an ADC or level detector for interpretation of the digital code.

The embodiments described above are based on the method where two capacitive paths are employed with a continuously variable duty cycle to match a range of possible frequencies. One advantage of this approach is that the reader may be easily tuned to the same frequency as the transponder. This is particularly advantageous with the feedback approach disclosed here, since the behaviour is simplified when the transformed modulation impedance is mostly resistive. If the reader and transponder are mismatched then the transformed impedance also includes reactive components, which can distort the output waveform from the near square waves shown in FIG. 15. In fact the shape of the output waveform when the transponder is modulating may be used to tune the reader to the transponder. This may be carried out with each read cycle or alternatively if only a small number of transponders are required to be recognised then this may be carried out in a pre-calibration step, giving one or more desired frequencies at which to operate the reader. Still another alternative method is to determine the transponder resonant frequency using a frequency sweep. Once tuned to the transponder resonant frequency, the read range of the system is maximised.

The feedback method may also be applied to a conventional resonant circuit rather than the preferred, switched capacitor resonant circuit described above. Such an embodiment would also beneficially employ a tuning circuit such that the reader drive frequency matches both the reader resonant frequency and the transponder resonance. The introduction of negative feedback to keep the resonance amplitude constant would have the same beneficial effect as outlined above. In particular a high Q coil may be employed for improved efficiency and potentially greater read range. Implementation with a conventional resonance can provide the following advantages that could offset the additional cost and complexity associated with a separate tuning circuit:

1) The conventional resonant circuit may have reduced distortion, which may be beneficial in fitting the output of the reader within regulatory limits, particularly at high power.

2) A conventional resonant circuit does not require the resonance FET that controls the variable duty cycle of the embodiment described above. This can be advantageous when operating at high power, since this situation could require a FET with an expensive specification.

The previous discussion has been in terms of an FDX RFID system, however this method may also have application for an HDX system. In the HDX system negative feedback is used in a similar manner to the FDX embodiments, for the duration of the communication portion of the read cycle. Here the amplitude of the antenna voltage is kept constant at a low level or even zero. The energy input into the reader antenna in order to maintain this constant level may yield a modulation signal substantially unlimited by high Q rate constraints. Such an approach may be favourable to the prior art that employs a damping circuit to lower the reader antenna Q for the duration of the communication cycle. This may be particularly favourable when the reader is required to work with both FDX and HDX transponders, in which case the circuit complexity may be reduced by employing the feedback method for both types of transponder, saving system cost.

Figure 17:
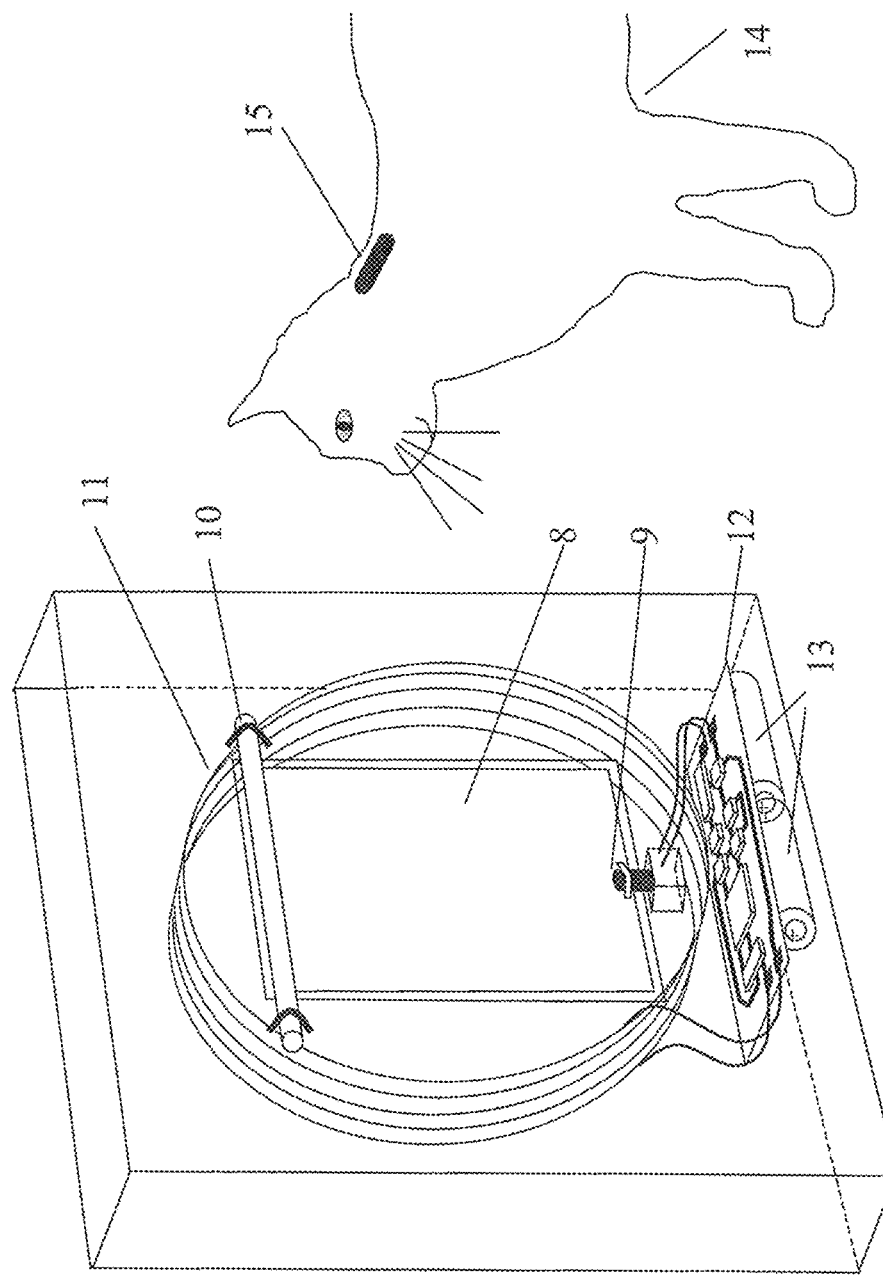
FIG. 17 shows an embodiment comprising a cat flap controlled by an RFID reader of a sub-dermal transponder.

FIG. 17 shows a fourth embodiment of the invention. The illustrated application is an animal entry control system, more specifically a cat flap. The cat flap comprises a door, 8, mounted on a hinge, 10, that has a lock, 9, controlled by an RFID reader. The reader antenna, 11, which is the same design as the first embodiment, surrounds the entry door through which the cat, 14, is intended to pass. The position of the embedded transponder, 15, in the cat is also shown.

Such an antenna arrangement achieves a large enclosed area for a given set of outer dimensions of the product. This large area is beneficial in achieving a good read range through a reduction in the rate of field decay with distance from the flap. The reader is powered by two batteries, 13, and the circuit board of the reader, 12, is mounted in the assembly such that its plane is essentially horizontal. This orientation ensures that the predominantly horizontal field lines in this location from the reader antenna do not lead to significant enclosed flux. This reduces the chance of complications associated with induced eddy currents.

The reader is designed to register the presence and identification number of a transponder that has been injected under the skin of the cat. For most of the time the reader is not actively reading the transponder but is in a low power mode, periodically generating a frequency sweep. Absorption from the frequency sweep is monitored to indicate the presence and resonant frequency of the transponder to be registered when a cat approaches. Once registered the reader moves into a higher power mode where a steady state energising signal is generated in the reader antenna at the resonant frequency of the transponder. The reader employs negative feedback such that high Q rate limitations may be avoided, and the low loss reader antenna affords improved efficiency and read range. There is also a tuning step to refine the energising frequency to match the transponder frequency, improving the signal quality in the reader. The transponder identification number is read by the reader and the door unlocked if it matches an earlier stored reference number. The reader subsequently reverts to the low power proximity detection mode to conserve battery life.

We have described above an RFID reader of sufficient read range and low power to make possible a battery operated cat flap sensing a sub-dermal transponder injected in a cat. As such the owner's cat may be allowed to enter a premises without allowing other animals entry. This application avoids the need for collar-mounted keys and therefore can provide the following advantages:

1) The cat is often 'chipped' with a sub-dermal RFID transponder to allow identification if lost or for taking the animal across national borders. As such a separate key does not need to be supplied with the cat flap, saving cost.

2) If the animal does not wear a collar then an external key may not be attached.

3) External keys can become detached from the collar, which would lock the animal out from the home. This is not the case for a sub-dermal transponder.

4) Some external keys, such as infra-red keys, require battery power that runs out over time. For the RFID reader only the cat flap requires battery power, not the key in the animal.

Figure 18:
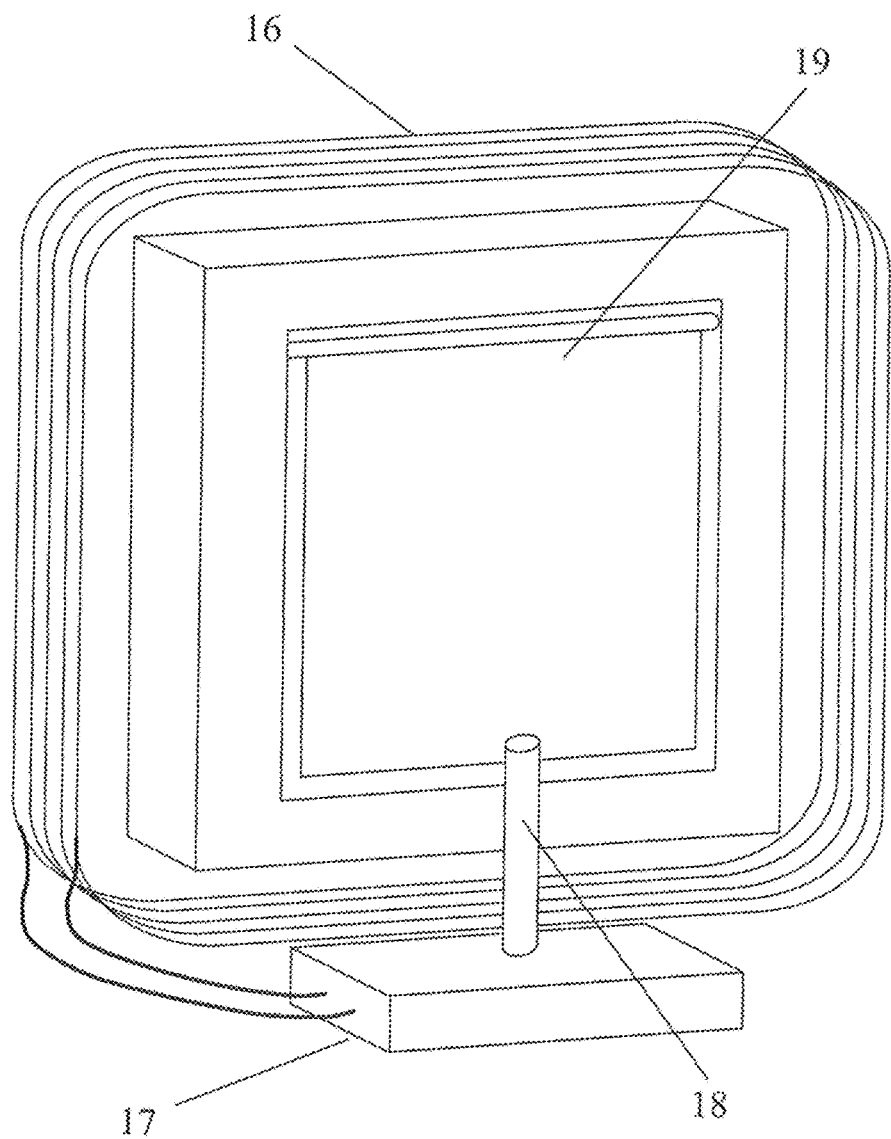
FIG. 18 shows an embodiment comprising an antenna, lock, and reader electronics that is mounted onto a standard cat flap.

FIG. 18 shows a fifth embodiment of the invention. This embodiment comprises an antenna 16, reader 17, and lock 18 that is separably mounted on to a standard pet door 19. This has the advantage that the user does not need to replace a pet door that is already installed in their house, rather they may fix (retrofit) the external reader to the existing door. The external reader is mounted on the inside of the house and the lock prohibits the flap opening inwards when the desired pet is not registered; this prohibits unwanted animals from entering the house. The flap is free to open outwards, allowing exit to any animal in the house.

The antenna mounts onto or around the perimeter of the pet door or flap and the lock mounts at the base of the pet flap, either on the pet flap or on the door or wall in which the flap is provided. Any convenient mounting technique may be employed, for example, gluing, screwing or bolting. The lock is configured to be retrofitted to an existing pet door, in particular having an upwardly projecting member which interferes with the inward opening of the pet door but which still allows the pet door to open outwards. The lock is under electronic control so that the upwardly projecting member can be controlled to allow inward opening of the pet door, for example by electromagnetic or other means. This control may, for example, retract the upwardly projecting member or permit the upwardly projecting member to hinge near its base.

The antenna, lock, and reader electronics perform the same functions as described for the third embodiment to read the ID number of a sub-dermal RFID chip in any animal approaching the flap. When the desired animal is registered the lock is released, allowing entry into the house. This system therefore provides the useful function of the full RFID reader pet door shown in the fourth embodiment (FIG. 17) with the added convenience of fitting as an addition to existing pet doors.

Applications of embodiments of the invention are not limited to those described above; rather these are a small subset of possible applications. Applications may be found in all existing RFID areas and also in new fields made possible by the reduced power and extended read range afforded.

Examples of potential applications of the technology include; for example:

1) Asset tracking
2) Access control for people or animals
3) Identification of people or animals.
4) Animal feeding control
5) Automatic vehicle identification
6) Labelling of products in a retail environment, for example for theft protection or bill totalling.
7) Storage of information, for example on a credit card or a passport.

Various arrangements are described below as E1 to E24. Any one or more of E1 to E24 may be provided in combination with any embodiment of the present invention as claimed.

E1. An RFID tag reader, the reader comprising:
an electromagnetic (EM) field generator for generating an electromagnetic (EM) field for modulation by said tag, said modulation comprising modulated load of said EM field by said tag;

a detector system responsive to fluctuations in strength of said EM field at said reader;

a negative feedback system responsive to said detector system to provide a control signal for said EM field generator for controlling said EM field generator to reduce said detected fluctuations; and a demodulator responsive to said control of said EM field to demodulate said EM field modulation by said tag.

E2. A tag reader as claimed in E1 configured for simultaneous operation of said EM field generator and said detector system.

E3. A tag reader as claimed in E1 or E2 wherein said tag comprises a passive tag, and wherein said EM field generator is configured to generate a substantially continuous EM field to power said tag.

E4. A tag reader as defined in any E1, E2, or E3 wherein at least one of said EM field generator and said detector comprises a resonant circuit including a coil with a Q of greater than 50, more preferably greater than 100.

E5. A tag reader as defined in any one of E1 to E4 wherein said EM field generator and said detector system share a common coil for generating said EM field and detecting said EM field fluctuations.

E6. A tag reader as defined any one of E1 to E5 wherein said feedback system includes an envelope detector to detect an envelope of said modulated EM field.

E7. A tag reader as defined in any one of E1 to E6 wherein said feedback system further comprises a pulse generator to drive said EM field generator responsive to said detector system.

E8. A tag reader as defined in E7 wherein said pulse generator is configured to control a power supply to said EM field generator, and further comprising a circuit to provide a demand signal, said demand signal being responsive to an energy drawn per cycle of said EM field from said power supply by said EM field generator, and wherein said demodulator is configured to demodulate said demand signal.

E9. A tag reader as defined in E8 further comprising a control system to control a tuning of said detector system responsive to a quality of said demodulated demand signal.

E10. A tag reader as defined in any one of E1 to E9 wherein said EM field generator and said detector system comprise a shared controllable electrical resonator.

E11. A method of remotely interrogating a transponder, the method comprising:
generating an electromagnetic (EM) field for modulation by said transponder, said modulation comprising modulated load of said EM field by said transponder;
detecting fluctuations in said EM field caused by said modulation;
applying feedback to said EM field generating to compensate said detected fluctuations; and
detecting said applied feedback to demodulate said modulation of said EM field by said transponder.

E12. Apparatus for remotely interrogating a transponder, the apparatus comprising:
means for generating an electromagnetic (EM) field for modulation by said transponder, said modulation comprising load absorption of said EM field by said transponder;
means for detecting fluctuations in said EM field caused by said modulation;
means for applying feedback to said EM field generating to compensate said detected fluctuations; and means for detecting said applied feedback to demodulate said modulation of said EM field by said transponder.

E13. A tag reader, method or apparatus as defined in any one of E1 to E12 wherein said modulated load of said EM field by said tag or transponder comprises modulated absorption of said EM field by said tag or transponder.

E14. An animal flap incorporating a tag reader as claimed in any one of E1 to E13.

E15. An animal flap as claimed in E14 further comprising an entry control device to inhibit entry of an animal through said animal flap and, responsive to said tag reader detecting an animal bearing a said tag, to allow entry of said tagged animal through said animal flap.

E16. A pet entry control system, the system comprising:
an RFID tag reader, in particular as claimed in any one of claims 1 to 10, configured for retrofitting to an animal flap; and
an animal entry control device to inhibit entry of an animal through said animal flap and, responsive to said tag reader detecting an animal bearing a said tag, to allow entry of said tagged animal through said animal flap.

E17. An animal flap as claimed in E14, E15 or E16 wherein said animal comprises a cat.

E18. An RFID system including a transponder and a reader for the transponder, wherein the reader is configured to use negative feedback to increase the stability of the amplitude of a resonance in the reader in the presence of a modulating transponder.

E19. An RFID system as claimed in E18 wherein a level of drive into the resonance of a resonant circuit is measured to demodulate said transponder modulation.

E20. An RFID system as claimed in E18 or E19 wherein the residual voltage variation of said amplitude is measured to demodulate said transponder modulation.

E21. An RFID system as claimed in E19 or E20 or an RFID tag reader as claimed in any one of claims 1 to 10 or 13 configured to use the shape of said demodulated modulation to tune the reader to the transponder frequency.

E22. An RFID system as claimed in any one of E1 to E20 wherein the system is a full-duplex system.

E23. An RFID system as claimed in any one of E18 to E21 wherein the system is a half-duplex system.

E24. An RFID system as claimed in any one of E18 to E23 wherein said reader comprises a resonant circuit with at least two capacitive paths and a FET to control a variable duty cycle of these paths to match the resonance to a range of frequencies.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. An RFID tag reader, the reader comprising:
    an electromagnetic (EM) field generator having a resonant circuit for generating an electromagnetic (EM) field for modulation by said tag, said modulation comprising modulating load of said EM field by said tag, the resonant circuit arranged such that current in the resonant circuit is responsive to said load modulation;
    a detector system responsive to fluctuations in strength of said EM field at said reader;
    a demodulator responsive to said detector system to demodulate said EM field modulation by said tag;
    a stimulus circuit for exciting resonance of the resonant circuit, the stimulus circuit comprising a switch circuit having a coupling to the EM field generator; and
    a rectified power supply output for powering the EM field generator, the power supply output coupled to a capacitor and to the switch circuit,
    wherein the switch circuit is coupled to, when the stimulus circuit is controlled to excite the resonance, pass charge from the EM generator to charge the capacitor until voltage on the capacitor reaches voltage on the EM field generator and then pass charge from the power supply to the EM field generator, wherein an increase in said load reduces a duration of said charging said capacitor and increases a duration of said passing charge to the EM field generator to compensate for variations in amplitude of resonance of the resonant circuit with variation of power delivered to the resonant circuit by the power supply.

2. A tag reader a claimed in claim 1, wherein the detector system is coupled to detect variation of amplitude of the resonance of the resonant circuit.

3. A tag reader as defined claim 2, wherein said detector system comprises an envelope detector to detect an envelope of said resonance, to thereby detect a modulation waveform.

4. A tag reader as claimed in claim 1, wherein the detector system is coupled to detect the envelope by detecting current pulses from the power supply.

5. A tag reader as claimed in claim 4, wherein the detector system comprises a current measurement circuit to measure the current pulses, the current measurement circuit comprising a ramp generator to generate a waveform having a maximum voltage determined by duration of a said current pulse.

6. A tag reader as claimed in claim 5, wherein the current measurement circuit comprises a capacitor to store the maximum voltage, the capacitor coupled to a decay resistor to thereby allow pickup of both increasing and decreasing variations in maximum voltage.

7. A tag reader as claimed in claim 1 configured for simultaneous operation of said EM field generator and said detector system.

8. A tag reader as claimed in claim 1 wherein said tag comprises a passive tag, and wherein said EM field generator is configured to generate a substantially continuous EM field to power said tag.

9. A tag reader as defined in any claim 1 wherein at least one of said EM field generator and said detector comprises a resonant circuit including a coil with a Q of greater than 50, more preferably greater than 100.

10. A tag reader as defined in claim 1 wherein said EM field generator and said detector system share a common coil for generating said EM field and detecting said EM field fluctuations.

11. A tag reader as defined in claim 1 wherein the stimulus circuit comprises a pulse generator to control switching of said switch circuit to thereby drive said EM field generator.

12. A tag reader as defined in claim 11 wherein said stimulus circuit is configured to control supply of power to said EM field generator, and further comprising a circuit to provide a demand signal, said demand signal being responsive to an energy drawn per cycle of said EM field from said power supply by said EM field generator, and wherein said demodulator is configured to demodulate said demand signal.

13. A tag reader as defined in claim 12 further comprising a control system to control a tuning of said detector system responsive to a quality of said demodulated demand signal.

14. A tag reader, method or apparatus as defined in claim 1 wherein said modulated load of said EM field by said tag or transponder comprises modulated absorption of said EM field by said tag or transponder.

15. An animal flap incorporating a tag reader as claimed in claim 1.

16. An animal flap as claimed in claim 15 further comprising an entry control device to inhibit entry of an animal through said animal flap and, responsive to said tag reader detecting an animal bearing a said tag, to allow entry of said tagged animal through said animal flap.

17. A pet entry control system, the system comprising:
- an RFID tag reader, as claimed in claim 1, configured for retrofitting to an animal flap; and
- an animal entry control device to inhibit entry of an animal through said animal flap and, responsive to said tag reader detecting an animal bearing a said tag, to allow entry of said tagged animal through said animal flap.

18. A method of remotely interrogating a transponder, the method comprising:
- powering an electromagnetic (EM) field generator from a rectified power supply output having an output capacitor, the EM field generator comprising a resonant circuit;
- generating, using the EM field generator, an electromagnetic (EM) field for modulation by said transponder, said modulation comprising modulating load of said EM field by said transponder, wherein current in the resonant circuit is responsive to said load modulation stimulating the resonant circuit by controlling a switch circuit coupled to the EM field generator and the rectified power supply output; and
- demodulating said modulation of said EM field by said transponder,
- wherein the stimulating comprises, when the switch circuit is controlled to excite the resonant circuit, the switch circuit passing charge from the EM field generator to charge the output capacitor until voltage on the output capacitor reaches voltage on the EM field generator and the switch circuit then passing charge from the power supply output to the EM field generator, wherein an increase in said load reduces a duration of said charging said output capacitor and increases a duration of said passing charge to the EM field generator, to compensate for variations in amplitude of resonance of the resonant circuit with variation of power delivered to the resonant circuit by the power supply output.

19. Apparatus for remotely interrogating a transponder, the apparatus comprising: means for generating an electromagnetic (EM) field for modulation by said transponder, said modulation comprising load absorption of said EM field by said transponder, the means comprising a resonant circuit such that current in the resonant circuit is responsive to said load modulation;
- means for powering the means for generating the EM field, the means for powering comprising a rectified power supply output having an output capacitor;
- means for stimulating the resonant circuit by controlling a switch circuit coupled to the means for generating an EM field and the rectified power supply output; and
- means for demodulating said modulation of said EM field by said transponder,
- wherein the means for stimulating is such that, when the switch circuit is controlled to excite the resonant circuit, the switch circuit passes charge from the means for generating an EM field to charge the output capacitor until voltage on the output capacitor reaches voltage on the means for generating an EM field and the switch circuit then passes charge from the power supply output to the means for generating an EM field, wherein an increase in said load reduces a duration of said charging said output capacitor and increases a duration of said passing charge to the means for generating an EM field, to compensate for variations in amplitude of resonance of the resonant circuit with variation of power delivered to the resonant circuit by the power supply output.

* * * * *